C. VON CULIN & G. W. BEACH.
DIRIGIBLE HEADLIGHT.
APPLICATION FILED SEPT. 25, 1916.
1,229,551.
Patented June 12, 1917.
3 SHEETS—SHEET 1.
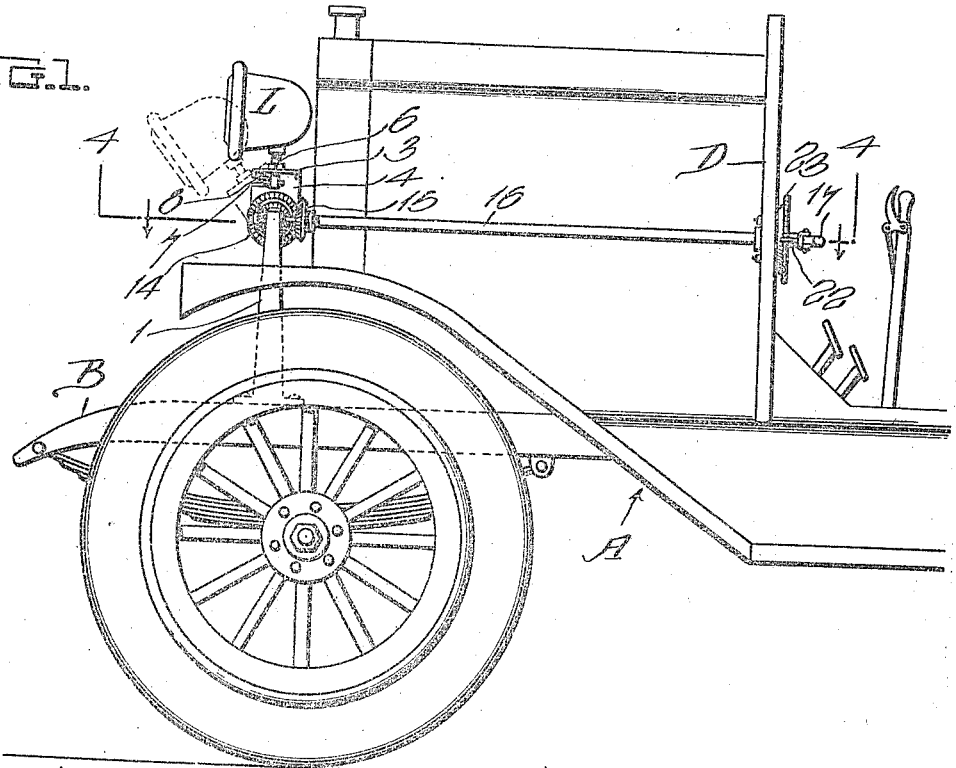
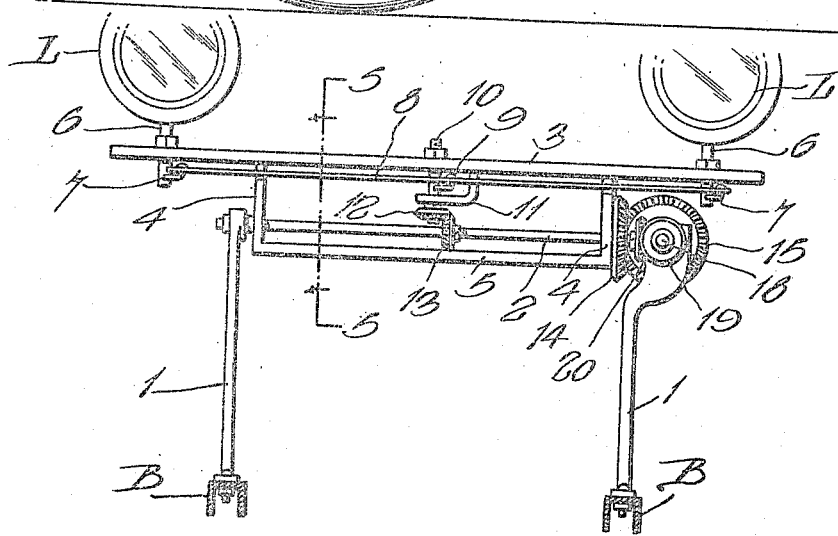
Witness
H. Woodard
Inventors
C. Von Culin
& G. W. Beach
By H. A. Wilson & co.
Attorneys

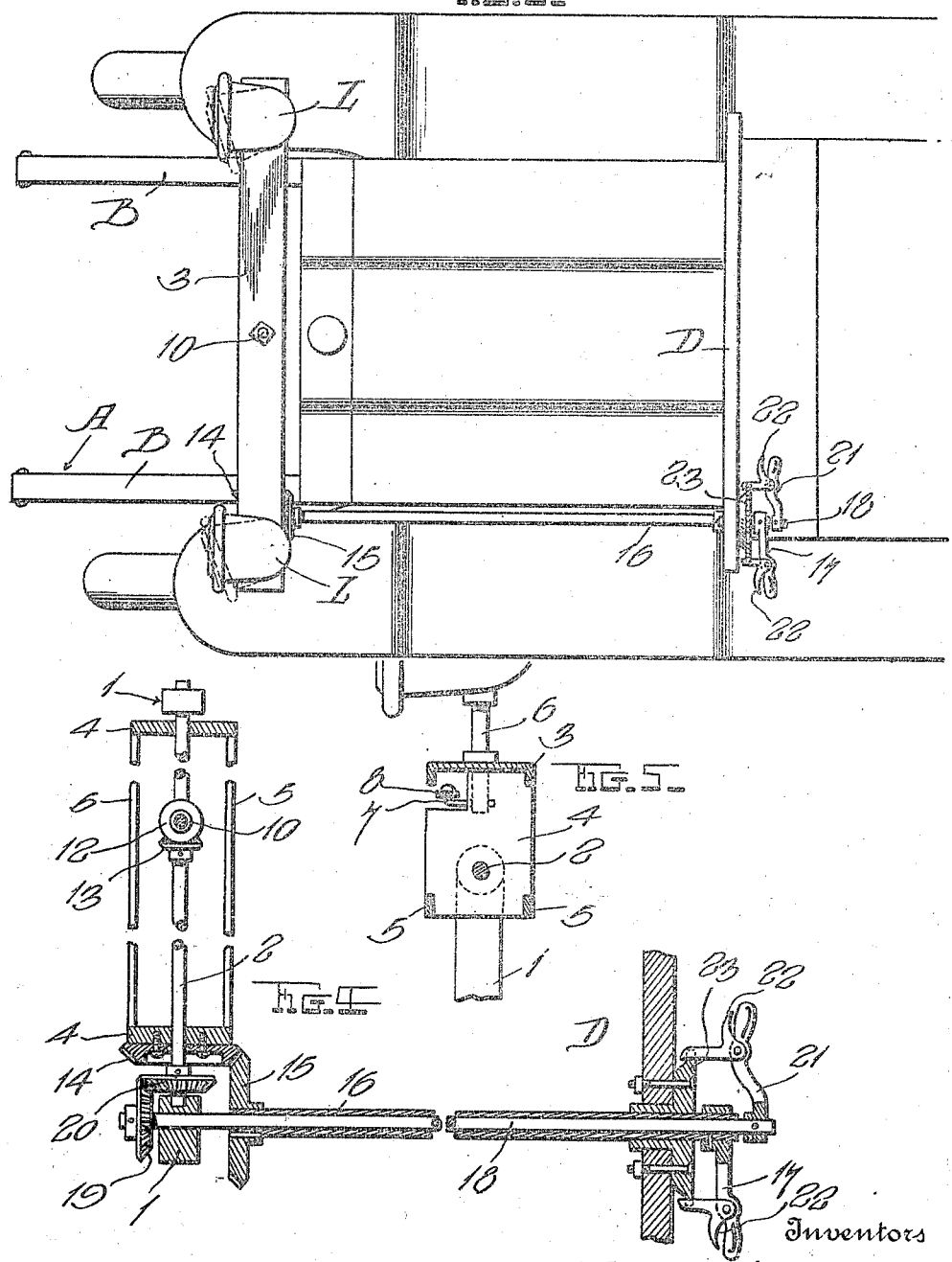

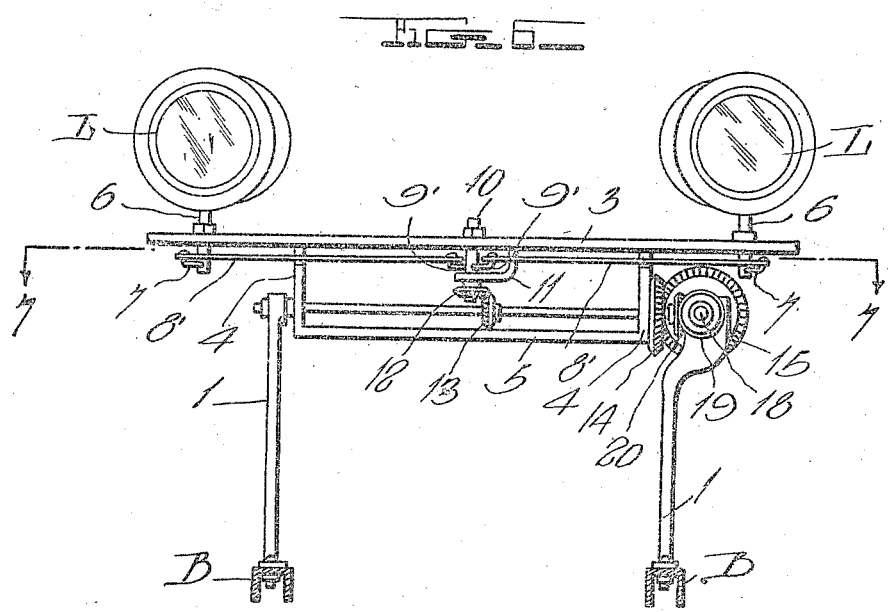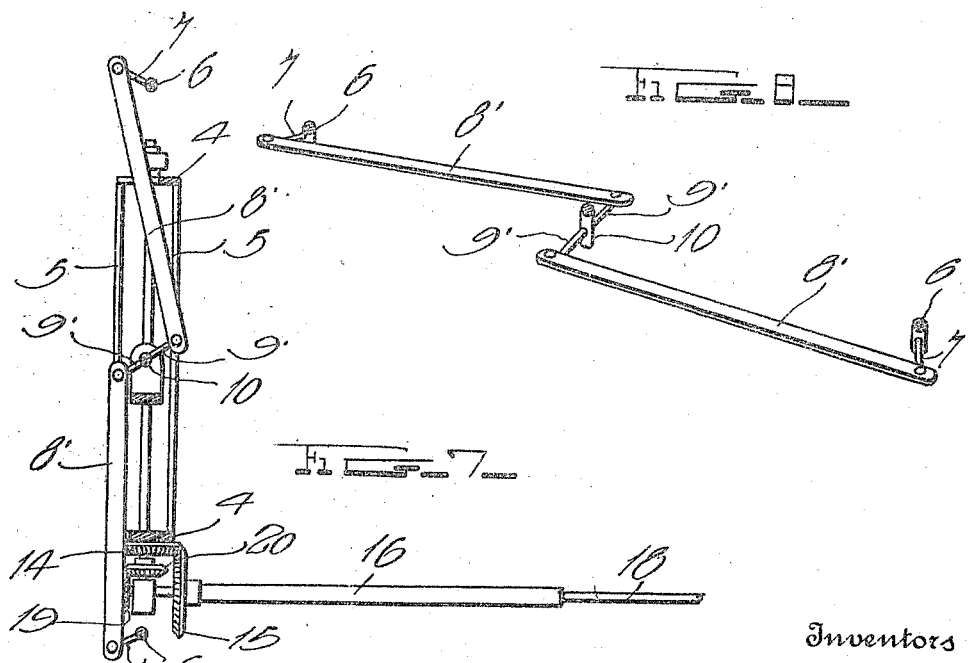

UNITED STATES PATENT OFFICE.

CLAYTON VON CULIN, OF NEW YORK, N. Y., AND GEORGE WATSON BEACH, OF SAYBROOK, CONNECTICUT.

DIRIGIBLE HEADLIGHT.

1,229,551.  Specification of Letters Patent.  Patented June 12, 1917.

Application filed September 25, 1916. Serial No. 122,135.

*To all whom it may concern:*

Be it known that we, CLAYTON VON CULIN, a citizen of the United States, residing at New York, in the county of New York and State of New York, and GEORGE WATSON BEACH, a citizen of the United States, residing at Saybrook, in the county of Middlesex and State of Connecticut, have invented certain new and useful Improvements in Dirigible Headlights; and we do declare the following to be a full, clear, and exact description of the invention, such as will enable others skilled in the art to which it appertains to make and use the same.

Our invention aims to provide a simple and inexpensive dirigible headlight for automobiles, the device being so constructed as to permit the rays of the two headlights to be thrown downwardly, upwardly, or from side to side at will.

With the foregoing general object in view, the invention resides in certain novel features of construction and in unique combinations of parts to be hereinafter fully described and claimed, the descriptive matter being supplemented by the accompanying drawings which constitute a part of this specification, and in which:

Figure 1 is a side elevation of a portion of an automobile showing the improved headlight applied;

Fig. 2 is a front elevation;

Fig. 3 is a top plan view of the invention applied to a machine;

Fig. 4 is a horizontal section on the plane of the line 4—4 of Fig. 1; and

Fig. 5 is a transverse section on the plane indicated by the line 5—5 of Fig. 2.

Fig. 6 is a view similar to Fig. 2, showing a modified form of construction;

Fig. 7 is a horizontal section on the plane indicated by the line 7—7 of Fig. 6;

Fig. 8 is a perspective view showing more particularly the arrangement of links and crank arms employed for turning the headlights in Figs. 6 and 7.

In the drawings, the numerals 1 designate a pair of attaching brackets to be secured to the side bars B of the chassis of an automobile A, said brackets having appropriate bearings at their upper ends in which a transverse horizontal shaft 2 is rotatably mounted. A preferably flat elongated support 3 is disposed above the shaft 2 and is adapted to extend transversely of the automobile as shown, said support having a pair of bearings 4 depending therefrom and mounted on the shaft 2, the lower ends of said bearings being preferably connected by bars 5 as depicted in Figs. 2, 4, and 5.

A pair of horizontally swinging lamp brackets 6 are mounted on the ends of the support 3 and are provided on their lower ends with cranks 7 upon which the opposite ends of a connecting rod 8 are pivoted, the center of said rod being connected with a crank 9 on a vertical rock shaft 10 mounted in a bearing opening through the support 3 and in a suitable bearing 11 which depends from said support. The lower end of shaft 10 carries a beveled gear 12 meshing with a similar gear 13 on shaft 2 whereby as said shaft 9 is turned the headlights will be swung horizontally.

A beveled gear 14 is secured rigidly to one of the bearings 4 and the shaft 2 passes loosely through said gear as disclosed in Fig. 4, a second beveled gear 15 being in mesh with the gear 14. Gear 15 is carried by the front end of a longitudinal tubular shaft 16 whose rear end passes through the dash D of the automobile and is provided with an operating lever 17 shown most clearly in Figs. 3 and 4. Telescoping with shaft 16 is another shaft 18 whose front end is rotatably mounted in the upper end of one of the bearing brackets 1, said front end having a beveled gear 19 meshing with a similar gear 20 secured on the adjacent end of shaft 2. The rear end of the shaft 18 is provided with a lever 21 similar to lever 17, both of these levers having catches 22 coöperating with a peripherally toothed disk 23 which is secured to the dash D.

By the construction described it will be obvious that turning of the lever 17 will, through the instrumentality of the shaft 16 and the gears 14 and 15, rock the entire support 3 to direct the rays of the headlights L downwardly or upwardly as occasion may demand. Turning of the lever 21, however, will cause the shaft 18 and the gears 19 and 20 to turn the shaft 2, the latter transferring motion to shaft 10 by means of the gears 12 and 13 so that the crank 9 shifts the rod 8 longitudinally and thus turns the lamp brackets 6 horizontally, the direction of turning being controlled by the manner in which the lever 21 is operated.

In Figs. 6, 7 and 8 the construction is identical with that above described with the exception of the operating connections between shaft 10 and the lamp brackets 6. In these figures the brackets 6 are equipped with forwardly extending crank arms 7 but shaft 10 is provided with a pair of crank arms 9' one of which projects forwardly and the other rearwardly, said arms being connected to the arms 7 by means of links 8'. By this arrangement, turning of the shaft 10 by the means previously described will simultaneously throw both lights L outwardly or inwardly, according to the direction in which said shaft is turned, this being a highly advantageous form of the invention since it permits the two lights to be moved inwardly and focused on the center of the roadway or allows them to be thrown outwardly in opposite directions when searching for sign posts or land marks along both sides of the highway. This latter operation is of great advantage to tourists following unfamiliar roads by means of charts and guidebooks, it being well known that certain land marks must often be located in order that the machine may turn in one direction or the other at the proper place.

By constructing the improved headlight in the manner shown and described, it will be simple and inexpensive yet highly efficient and durable, and for these reasons, the construction shown constitutes the preferred form of the device. It is to be understood, however, that within the scope of the invention as claimed, numerous minor changes may be made without sacrificing the principal advantages.

We claim:

1. A dirigible headlight comprising an elongated rocking support to extend transversely across the front of an automobile, and a pair of horizontally swinging lamp brackets mounted on said support; in combination with a beveled gear secured to said support on the axis thereof, a shaft extending longitudinally of the support and passing through said gear, operating connections between said shaft and the lamp brackets for swinging the latter upon turning of said shaft, a beveled gear on said shaft adjacent the aforesaid gear, a pair of telescoping shafts to extend to a point adjacent the driver's seat, and beveled gears on said telescoping shafts meshing with the aforesaid gears.

2. A dirigible headlight comprising a pair of brackets to be secured to an automobile, a shaft extending between and rotatably supported by said brackets, a horizontally elongated support above said shaft having depending bearings mounted on the latter, a beveled gear secured to one of said bearings and having its axis alined with the axis of the shaft, a pair of horizontally swinging lamp brackets mounted on the ends of the support, operating connections between these brackets and the shaft for swinging them when said shaft is rotated, a second beveled gear secured to said shaft adjacent the aforesaid gear, and a pair of telescoping shafts having beveled gears meshing with the aforesaid gears, the innermost of said shafts being rotatably supported by one of the first mentioned brackets.

3. A dirigible headlight comprising a support, a pair of horizontally swinging lamp brackets thereon, crank arms extending in the same direction from said brackets, a vertical rock shaft between said brackets and having oppositely extending crank arms, a link connecting one crank arm of the shaft with the arm of one lamp bracket, a second link connecting the other crank arm of said shaft with the other lamp bracket, and means for turning said rock shaft.

In testimony whereof we have hereunto set our hands in the presence of two subscribing witnesses.

CLAYTON VON CULIN.
GEORGE WATSON BEACH.

Witnesses:
GILES A. BUSHNELL,
WILLIAM R. BUSHNELL.